(12) United States Patent
Holden et al.

(10) Patent No.: US 11,332,070 B2
(45) Date of Patent: May 17, 2022

(54) HOSE OVER PULL PROTECTION

(71) Applicant: Halliburton Energy Services, Inc., Houston, TX (US)

(72) Inventors: Kristin K. Holden, Fletcher, OK (US); Dustin R. Holden, Fletcher, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/497,693

(22) PCT Filed: Apr. 28, 2017

(86) PCT No.: PCT/US2017/030167
§ 371 (c)(1),
(2) Date: Sep. 25, 2019

(87) PCT Pub. No.: WO2018/199988
PCT Pub. Date: Nov. 1, 2018

(65) Prior Publication Data
US 2020/0023771 A1      Jan. 23, 2020

(51) Int. Cl.
*B60Q 9/00* (2006.01)
*B60Q 5/00* (2006.01)
(Continued)

(52) U.S. Cl.
CPC .............. *B60Q 9/00* (2013.01); *B60Q 5/005* (2013.01); *B60T 7/12* (2013.01); *G06K 7/10366* (2013.01);
(Continued)

(58) Field of Classification Search
CPC ......... B60P 3/2265; B60Q 5/005; B60Q 9/00; B60T 7/12; B67D 7/3218;
(Continued)

(56) References Cited

U.S. PATENT DOCUMENTS 6,021,823 A    2/2000  Hale
7,195,149 B2   3/2007  Baker et al.
(Continued)

FOREIGN PATENT DOCUMENTS

EP    3122618 B1    7/2019
JP    10324400 A   12/1998
(Continued)

OTHER PUBLICATIONS

International Search Report and Written Opinion for PCT application No. PCT/US2017/030167 dated Jan. 16, 2018, 10 pages.
(Continued)

*Primary Examiner* — Omer S Khan
(74) *Attorney, Agent, or Firm* — Conley Rose, P.C.; Rodney B. Carroll

(57) ABSTRACT

System and method for providing a warning to a driver when a tanker truck is in a potential hose drive-off situation. The system and method are designed to detect when a hose or other conduit is in close proximity or attached to the tanker truck and alert the driver. This hose drive-off warning system and method may also physically prevent the vehicle from driving away in some embodiments while the hose or other conduit is still attached to the vehicle.

20 Claims, 3 Drawing Sheets

(51) Int. Cl.
*B60T 7/12* (2006.01)
*G06K 7/10* (2006.01)
*G06K 19/077* (2006.01)
*B60P 3/22* (2006.01)

(52) U.S. Cl.
CPC ...... *G06K 19/07758* (2013.01); *B60P 3/2265* (2013.01)

(58) Field of Classification Search
CPC ......... G06K 19/07758; G06K 7/10366; G08B 21/18; G08B 21/24; G08B 3/10; G08B 5/22
See application file for complete search history.

(56) References Cited

U.S. PATENT DOCUMENTS

| | | | |
|---|---|---|---|
| 8,869,843 B2 | 10/2014 | Tague et al. | |
| 9,150,310 B1* | 10/2015 | Bray | B64D 39/00 |
| 2009/0315729 A1* | 12/2009 | Inhoffer | B64F 1/28 |
| | | | 340/632 |
| 2011/0025482 A1* | 2/2011 | Alguera | B60D 1/62 |
| | | | 340/431 |
| 2011/0187064 A1* | 8/2011 | Breiner | B60P 3/00 |
| | | | 280/4 |
| 2011/0237090 A1 | 9/2011 | Ehrlich et al. | |
| 2012/0111448 A1 | 5/2012 | Brakefield et al. | |
| 2013/0025698 A1 | 1/2013 | Safi-Samghavadi et al. | |
| 2013/0112295 A1 | 5/2013 | McNicholas | |
| 2015/0186837 A1* | 7/2015 | Bianco | B67D 7/348 |
| | | | 235/381 |

FOREIGN PATENT DOCUMENTS

| | | |
|---|---|---|
| JP | 2010105708 A | 5/2010 |
| KR | 10-1080961 B1 | 11/2011 |
| KR | 10-2016-0094597 A | 8/2016 |

OTHER PUBLICATIONS

Jonathan Collins; "Industrial Hoses Couple Up with RFID"; RFID Journal; May 5, 2005; 2 pages.
"RFID Monitors Hose Connections/Applications"; Pepperl+Fuchs North America; Aug. 22, 2016; 4 pages. www.pepperl-fuchs.us/usa/en/20024.htm.
Jonathan Collins; "Protects Liquid Assets"; RFID Journal, RFID; Mar. 24, 2004; 2 pages.
"Gates: Today's Advanced Hose and Hydraulic Systems" Gates Sentry Services, 19 pages, www.gatesprograms.com/senryservices.
UK Exam Report for GB Application No. GB1913876.7 dated Sep. 3, 2021. 3 pages.

* cited by examiner

HOSE OVER PULL PROTECTION

TECHNICAL FIELD

The exemplary embodiments disclosed herein relate generally to systems and methods for detecting and preventing a vehicle from driving off while a hose or other conduit is still attached to the vehicle.

BACKGROUND

Materials for oilfield applications, such as fracturing fluids, proppants, cement, various oilfield chemicals, and the like, are typically transported to oilfield service sites via tanker trucks and trailers. The materials are typically loaded onto the tanker trucks and trailers at a materials distribution center or a processing plant and then transported to the service sites. These vehicles may also carry away waste products, plant discharge, and the like from the processing plant and the service sites. In a typical arrangement, a hose may be attached to a hose coupling on the tanker trucks or trailers and the materials may be pumped into containers or tanks on the tanker trucks or trailers. The materials may then be offloaded from the vehicles in the same way.

An ongoing problem with the above arrangement is drivers occasionally drive away with the hose still attached to the tanker trucks and trailers. When such a hose drive-off happens, potentially significant damage may occur to the hose, the tanker trucks and trailers, and/or the plant. Even when no damage is apparent, a hose that has been involved in a drive-off must typically be taken out of service and replaced as a safety measure.

Accordingly, what is needed is a way to warn drivers when a vehicle is in a potential hose drive-off situation and also to prevent the vehicle from driving away while the hose is still attached.

BRIEF DESCRIPTION OF THE DRAWINGS

For a more complete understanding of the exemplary disclosed embodiments, and for further advantages thereof, reference is now made to the following description taken in conjunction with the accompanying drawings in which.

DESCRIPTION OF EXEMPLARY EMBODIMENTS

The following discussion is presented to enable a person skilled in the art to make and use the exemplary disclosed embodiments. Various modifications will be readily apparent to those skilled in the art, and the general principles described herein may be applied to embodiments and applications other than those detailed below without departing from the spirit and scope of the disclosed embodiments as defined herein. Accordingly, the disclosed embodiments are not intended to be limited to the particular embodiments shown, but are to be accorded the widest scope consistent with the principles and features disclosed herein.

The embodiments disclosed herein relate to a system and method for providing a warning to a driver when a tanker truck or trailer is in a potential hose drive-off situation. The system and method are designed to detect when a hose or other conduit is in close proximity or attached to the vehicle and alert the driver of the vehicle. This hose drive-off warning system and method may also physically prevent the vehicle from driving away in some embodiments while the hose or other conduit is still attached to the vehicle. In one exemplary implementation, the hose drive-off warning system and method may use a hose detection unit to detect when a fluid line is attached to the vehicle or within a nominal detection zone of the detection system. The hose detection unit mounts on an exterior of the vehicle and communicates with a notification unit in the vehicle driver area. Upon detection of a hose, the hose detection unit activates the notification unit to notify the driver that the hose is still attached to the vehicle. In some implementations, the hose detection unit may also communicate with a control valve in an air brake system of the vehicle. Upon detection of the hose, the hose detection unit actuates the control valve to physically prevent the vehicle from driving away. When the hose is no longer detected, the hose detection unit resets the notification unit and, in some embodiment, also releases the control valve to allow the vehicle to drive away.

Figure 1:
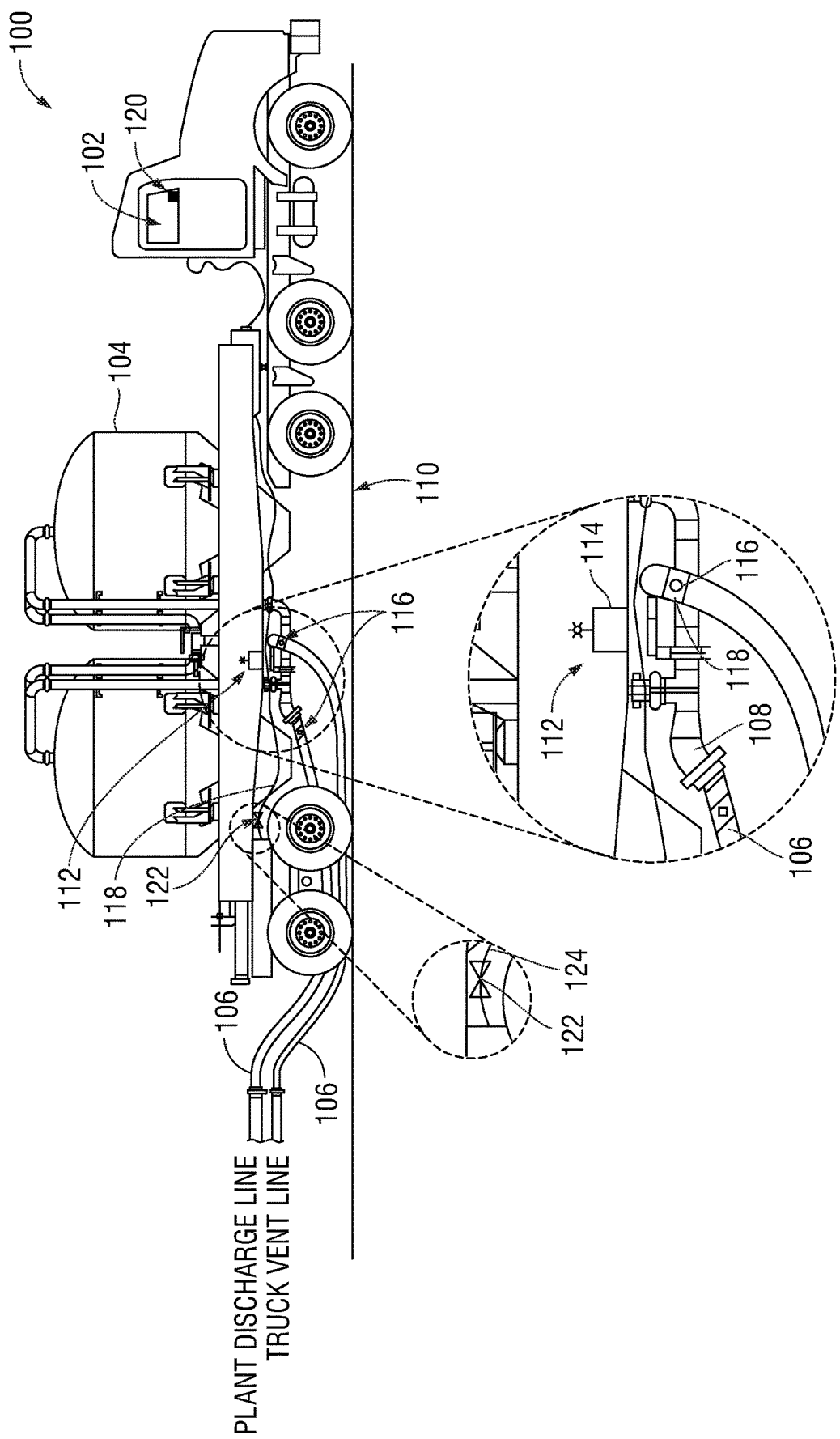
FIG. 1 illustrates a tanker truck having an exemplary hose drive-off warning system according to the disclosed embodiments.

Referring now to FIG. 1, a vehicle 100 is shown on which the exemplary hose drive-off warning system and method have been deployed. The specific vehicle in this example is a tanker truck 100 that has a truck cab or driver area 102 where a driver may sit and a trailer for transporting one or more containers or tanks 104. One or more hoses or other conduits 106 may then be connected to the tanker truck 100 to fill (or empty) the tanks 104, for example, via a hammer union connection or other hose coupling 108 on the tanker truck 100. The one or more hoses 106 may include a plant discharge hose, a truck vent hose, or other types of hoses.

Although a tanker truck is shown in FIG. 1, it should be understood that other types of vehicles besides tanker trucks may be used with the exemplary system and method disclosed herein, including trailer trucks, refrigerated trucks, and the like. As well, although hoses carrying oilfield materials are discussed herein, it should be understood that the disclosed system and method may also be used to warn of other types of hoses, including hoses used to pump dry materials, and the like.

In accordance with the disclosed embodiments, an exemplary hose drive-off warning system, generally indicated at 110, may be installed on the tanker truck 100. As alluded to above, the hose drive-off warning system 110 operates to detect when the hose 106 is in close proximity or attached to the tanker truck 100 and to alert the driver of a potential hose drive-off situation. To this end, the hose drive-off warning system 110 may include a hose detection unit, generally indicated at 112, mounted on an exterior of the tanker truck 100 near the hose coupling 108 on the tanker truck 100. The hose detection unit 112 operates to detect when the hose 106 is nearby or within a nominal detection zone of the detection unit. Any suitable proximity detector known to those having ordinary skill in the art may be used as or with the hose detection unit 112, including optical detectors, infrared detectors, radio frequency (RF) detectors, electromagnetic (EM) detectors, and the like.

In the embodiment of FIG. 1, the hose detection unit 112 may be, or may include, an RFID reader 114. One or more RFID tags 116 may then be used in conjunction with the RFID reader 114. Each RFID tag 116 may be mounted on a hose or other conduit 106, for example, via a band or collar 118 fastened around the hose 106 near or on a nozzle (not expressly shown) thereof. This allows the RFID reader 114 to detect when the hose 106 is connected to the hose coupling 108 or within a nominal detection zone of the RFID reader 114. The workings of the RFID reader 114 and the RFID tags 116 is well known to those having ordinary skill in the art and therefore a detailed discussion is omitted here. Briefly, the RFID tag 116 has an electronic chip containing electronically stored information that allows it to be uniquely identified by the RFID reader 114. The RFID tag 116 may be a "passive tag" that derives energy off the interrogation signals from the RFID reader 114, or it may be an "active tag" that has its own local power source, such as a battery.

In an alternative embodiment, instead of the RFID reader 114, the hose detection unit 112 may be, or may include, a proximity sensor (not expressly shown). Proximity sensors can detect the presence of a nearby object by emitting an electromagnetic field or a beam of electromagnetic radiation (e.g., infrared) and looking for changes in the field caused by the object being detected. The "object" in this example is the hose 106 itself so no additional component, such as an RFID tag, is needed to identify the hose 106. Of course, those having ordinary skill in the art understand that different types of objects may require different types of proximity sensors. For example, a capacitive or photoelectric sensor may be suitable for plastic objects, whereas an inductive proximity sensor may be suitable for metal objects.

General operation of the hose detection unit 112 entails detecting when a hose 106 is attached to the tanker truck 100 or within a nominal detection zone of the detection unit. Upon detection of the hose 106, the hose detection unit 112 activates a notification unit 120 in the driver area 102 of the tanker truck 100. The notification unit 120 acts as a warning to the driver that the hose 106 is still attached to the tanker truck 100 or is within a nominal detection zone of the detection unit. The size of the nominal detection zone may vary depending on several factors, including the type of hose detection unit 112 (e.g., RFID reader-based, proximity sensor-based, etc.), the frequency of the interrogation field or signal, the type of object being detected, and the like. Preferably the nominal detection zone has at least a 3-foot radius about the hose detection unit 112 in order to provide a sufficient margin of safety, but a larger or smaller detection zone may certainly be used as needed. In any event, upon being notified by the notification unit 120, the driver may exit the driver area 102 to detach and remove the hose 106 from the tanker truck 100. The hose detection unit 112 may thereafter reset the notification unit 120.

In some embodiments, the hose detection unit 112 may also physically prevent the tanker truck 100 from driving away, for example, by locking the brakes of the tanker truck 100. According to these embodiments, the hose detection unit 112 may actuate a control valve 122 in an air brake system (not expressly shown) of the tanker truck 100 upon detection of the hose 106. For example, the control valve 122 may be mounted on a brake line 124 of the air brake system and may be actuated to vent air from the air brake system upon detection of the hose 106. Venting air from the air brake system is designed to cause the air brakes to lock, thus physically preventing the tanker truck 100 from driving away. The driver may then exit the driver area 102 to detach and remove the hose 106 from the tanker truck 100, after which the hose detection unit 112 may release the air brake system.

Communication between the control valve 122 and the hose detection unit 112 may be implemented using wireless, wired, or any other communication method known to those having ordinary skill in the art. Examples of control valves 122 that may be used with the embodiments disclosed herein include wireless control valves from Emerson Electric, Inc., of St. Louis, Mo. (see, e.g., Fisher series of wireless valves). Likewise, communication between the hose detection unit 112 and the notification unit 120 may be implemented using any communication technique known to those having ordinary skill in the art, including wireless and wired communication. For example, the hose detection unit 112 may communicate with the notification unit 120 using short range wireless protocols, such as Wi-Fi, Bluetooth, and the like.

Figure 2A:
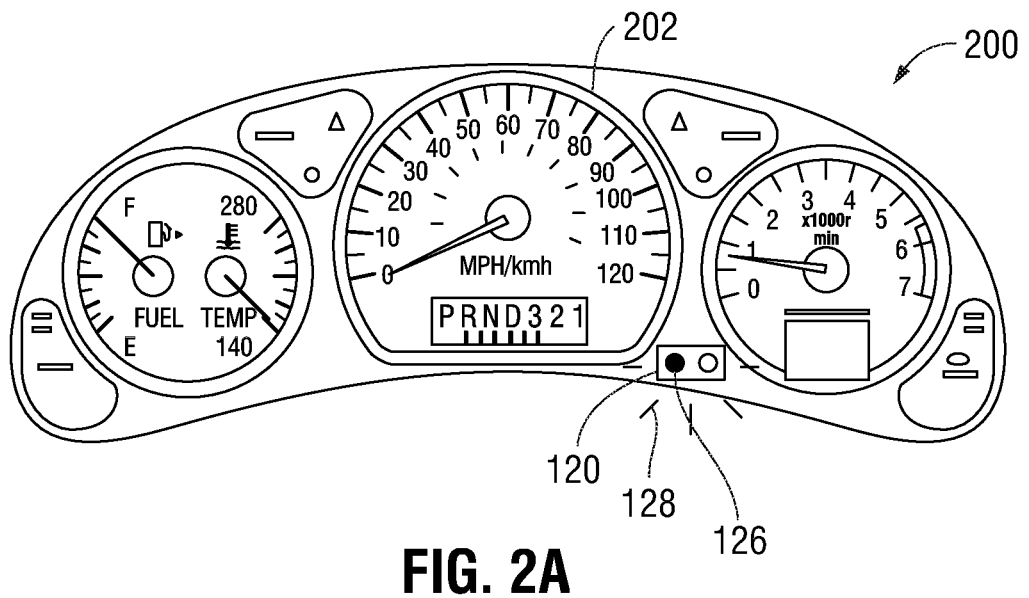
FIGS. 2A and 2B illustrate an exemplary alarm unit for an exemplary hose drive-off warning system according to the disclosed embodiments.
Figure 2B:
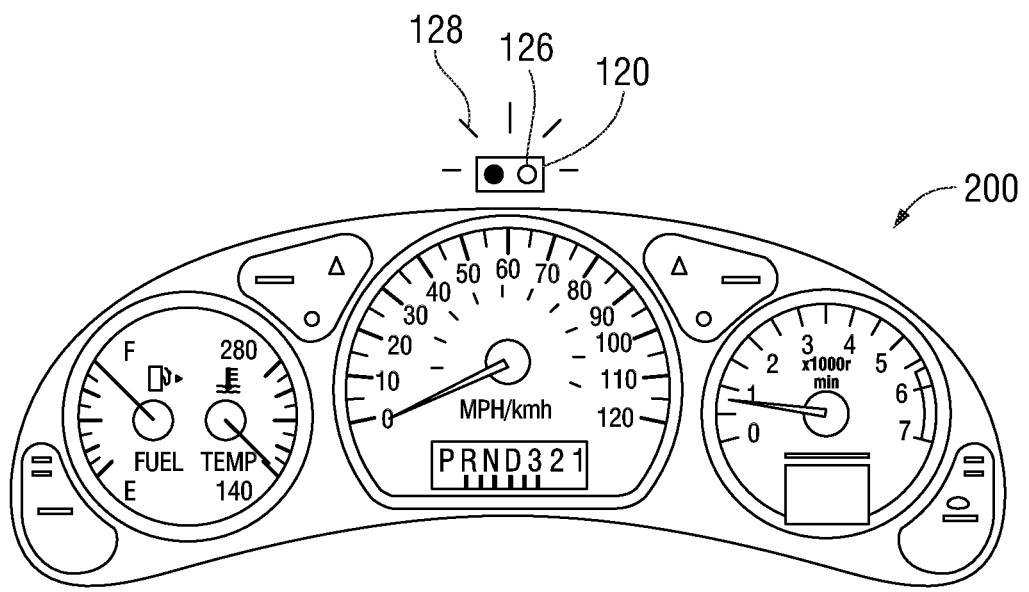

FIGS. 2A and 2B illustrate exemplary implementations of the notification unit 120. In these embodiments, the notification unit 120 may include an LED or other light source 126 that illuminates when the hose detection unit 112 activates the notification unit 120. There may be a single light source 126 that lights up when the notification unit 120 is activated and turns off when the notification unit 120 is reset. Alternatively, there may be two light sources 126, such as a red light source and a green light source, to indicate when the fluid line is attached to and detached from the tanker truck, respectively. Additionally (or alternatively), the notification unit 120 may include an audio alarm that beeps, indicated at 128, or otherwise audibly alerts the driver that the fluid line is still attached to the tanker truck.

In the embodiment of FIG. 2A, the notification unit 120 is mounted on a dashboard 200 of the tanker truck in a visually prominent location, such as near a speedometer 202. In the embodiment of FIG. 2B, the notification unit 120 is mounted in a different location, for example, on top of the dashboard 200. Those having ordinary skill in the art of course understand that the notification unit 120 may be mounted in any other visually and/or audibly prominent location within the driver area 102 besides the dashboard 200.

Figure 3:
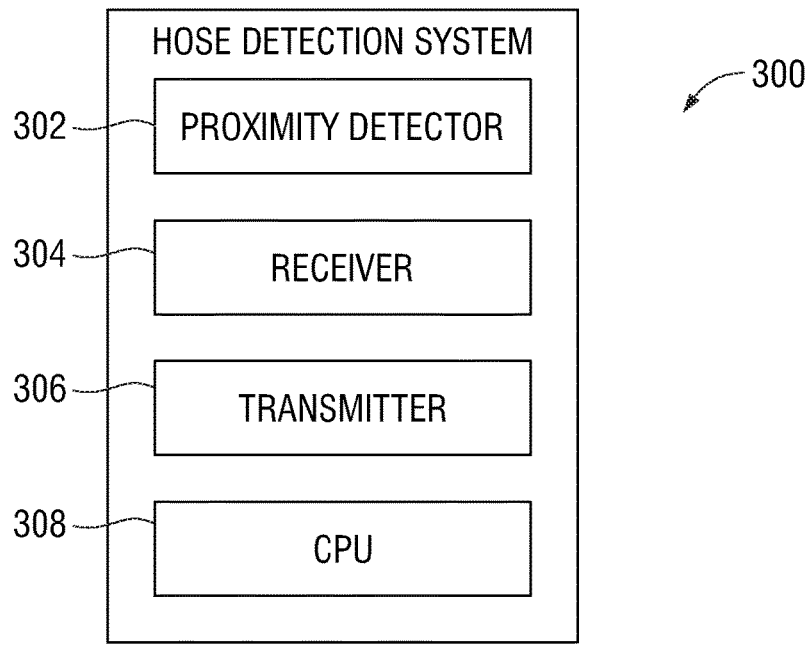
FIG. 3 illustrates an exemplary hose detection unit system according to the disclosed embodiments.

FIG. 3 illustrates an exemplary implementation of a hose detection unit 300 according to some embodiments. In this example, the hose detection unit 300 is composed of a number of functional components, including a proximity detector 302, a receiver 304, a transmitter 306, and a central processing unit (CPU) 308. Note that although the various components 302-308 are depicted here as discrete blocks, it should be understood that any block may be divided into two or more constituent blocks and any two or more blocks may be combined to form a single block without departing from the scope of the exemplary disclosed embodiments.

In general, the proximity detector 302 operates to determine when a fluid line is within a nominal detection zone. As mentioned above, the proximity detector 302 may include any suitable proximity detector known to those having ordinary skill in the art, such as optical detectors, infrared detectors, RF detectors, EM detectors, and the like. Examples of suitable proximity detectors include RFID readers, proximity sensors (e.g., the TopWorx series of proximity sensors available from Automatic Switch Company of Hanover, N.J.), and the like, as described herein.

The receiver 304 operates to receive signals from a notification unit and, depending on the implementation, also from a control valve in an air brake system of the tanker truck. Any suitable receiver 304 known to those having ordinary skill in the art may be used, including a wireless receiver (e.g., Wi-Fi, Bluetooth, etc.), a wired receiver (e.g., Ethernet, etc.), or a combination of both.

In a similar manner, the transmitter 306 operates to transmit signals to a notification unit and, depending on the implementation, also to a control valve in an air brake system of the tanker truck. Any suitable transmitter 306 known to those having ordinary skill in the art may be used, including a wireless transmitter (e.g., Wi-Fi, Bluetooth, etc.), a wired transmitter (e.g., Ethernet, etc.), or a combination of both.

It is also possible for the receiver 304 and the transmitter 306 to be combined into a single transceiver without departing from the scope of the disclosed embodiments.

The CPU 308 controls the overall operation of the hose detection unit 300. To this end, the CPU 308 may be connected to and may receive input signals from and/or send output signals to the proximity detector 302, the receiver 304, and the transmitter 306. Such a CPU 308 may be any suitable CPU known to those having ordinary skill in the art, including a microprocessor, microcontroller, an application-specific integrated circuit (ASIC), a field programmable gate array (FPGA), and the like. In one implementation, the CPU 308 may be one of several 8-bit PIC microcontroller units available from Microchip Technology, Inc., of Chandler, Ariz.

Figure 4:
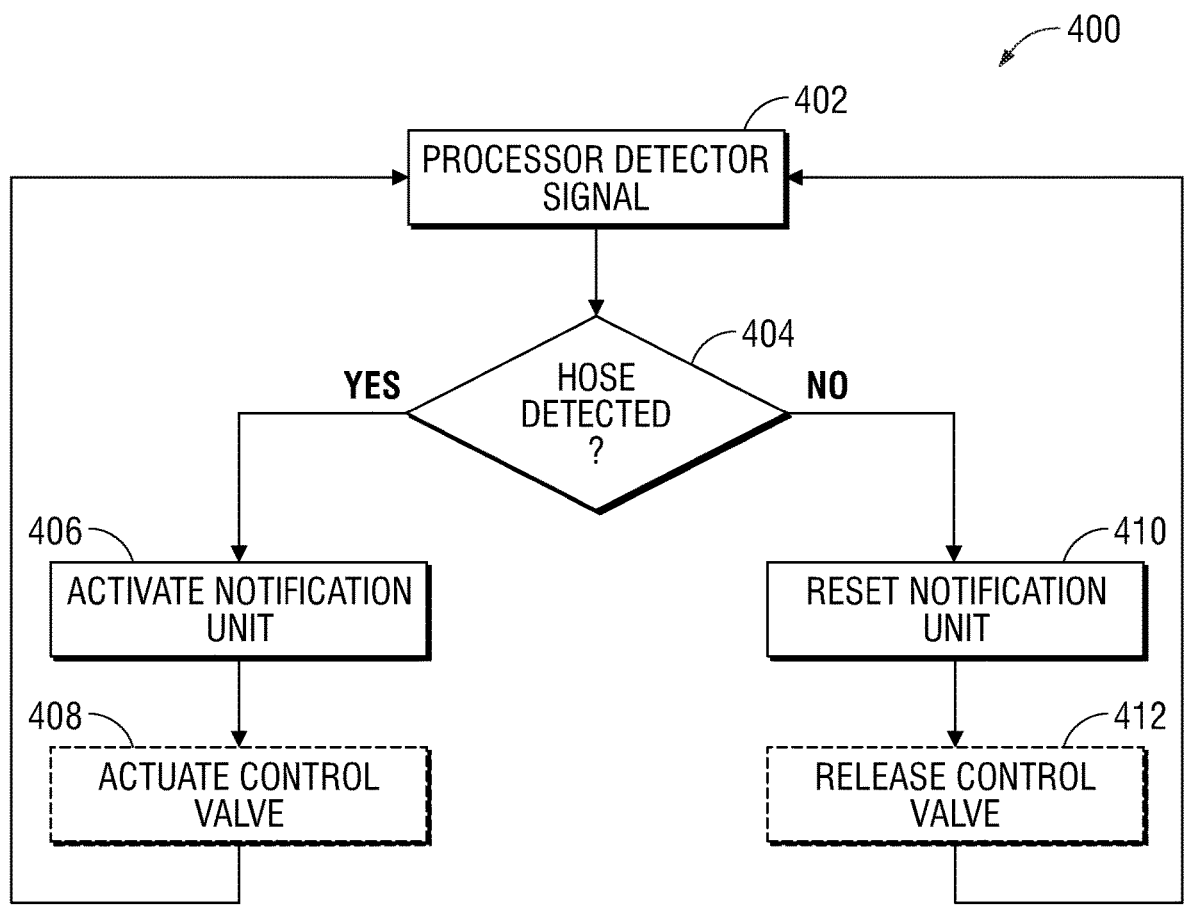
FIG. 4 illustrates an exemplary method that may be used with an exemplary hose detection unit system according to the disclosed embodiments.

Operation of the CPU 308 is described with respect to FIG. 4, which illustrates an algorithm, or portion thereof, in the form of a flow chart 400 that may be executed the CPU 308. Those having ordinary skill in the art understand of course that the flow chart 400 illustrates only one exemplary algorithm, and alternative arrangements may be derived from the teachings presented herein without departing from the scope of the disclosed embodiments.

The flowchart 400 generally begins at block 402 where the CPU 308 receives and processes a detection signal from the proximity detector 302. Depending on the type of proximity detector 302 being used, the detection signal may be an analog signal or a digital signal, including a logic high, a logic low, a bit, a series of bits, a byte, a word, and the like. At block 404, the CPU 308 determines whether the detection signal from the proximity detector 302 indicates that a hose has been detected by the proximity detector 302 to be within a nominal detection zone thereof.

If the determination at block 404 is yes, then the CPU 308 transmits an output signal to the notification unit at block 406 via the transmitter 306 to activate the notification unit. The output signal may be transmitted to the notification unit using any communication technique known to those having ordinary skill in the art, as discussed above. In some embodiments, the CPU 308 may also transmit a similar output signal at block 408 to a control valve in the air brake system of the tanker truck to vent the air from the air brake system, thereby locking the air brake system. Any acknowledgment, confirmation, or other return signal from the notification unit and/or the control valve may be received by the receiver 304 and passed along to the CPU 308 as an input signal. The CPU 308 thereafter returns to block 402 to continue processing the detection signal from the proximity detector 302.

If the determination at block 404 is no, then the CPU 308 transmits a different output signal to the notification unit at block 410 via the transmitter 306 to reset the notification unit. In some embodiments, the CPU 308 may also transmit a similar output signal at block 412 to the control valve in the air brake system of the tanker truck to release or otherwise close the control valve, thereby unlocking the air brake system. The CPU 308 thereafter returns to block 402 to continue processing the detection signal from the proximity detector 302.

Accordingly, as set forth above, the embodiments disclosed herein may be implemented in a number of ways. For example, in general, in one aspect, the disclosed embodiments may relate to a system for issuing a warning when a hose is attached to a vehicle. The system comprises, among other things, a notification unit mountable within a driver area of the vehicle, and a hose detection unit in communication with the notification unit and mountable on an exterior of the vehicle adjacent to a hose coupling of the vehicle. The hose detection unit is operable to activate the notification unit when the hose is attached to the hose coupling of the vehicle and further operable to reset the notification unit when the hose is detached from the hose coupling of the vehicle.

In accordance with any one or more of the foregoing embodiments, the system further comprises a control valve installable in an air brake system of the vehicle, wherein the hose detection unit is further operable to actuate the control valve to lock the air brake system when the hose is attached to the hose coupling of the vehicle.

In accordance with any one or more of the foregoing embodiments, the notification unit includes one of: a visual alarm, an audio alarm, or an audio-visual alarm.

In accordance with any one or more of the foregoing embodiments, the hose detection unit includes one of: an RFID reader, or a proximity sensor.

In accordance with any one or more of the foregoing embodiments, the system further comprises an RFID tag attachable to the hose, wherein the RFID tag may be one of: an active RFID tag, or a passive RFID tag.

In accordance with any one or more of the foregoing embodiments, the proximity sensor is an electromagnetic proximity sensor.

In general, in another aspect, the disclosed embodiments may relate to a method of issuing a warning when a hose is attached to a vehicle. The method comprises, among other things, determining whether the hose is within a nominal detection zone of a hose detection unit mounted on an exterior of the vehicle adjacent. The method further comprises activating a notification unit mounted within a driver area of the vehicle if the hose is determined to be within the nominal detection zone of the hose dissection unit and resetting the notification unit if the hose is determined to be outside the nominal detection zone of the hose detection unit.

In accordance with any one or more of the foregoing embodiments, the method further comprises actuating a control valve installed in an air brake system of the vehicle to lock the air brake system if the hose is determined to be within the nominal detection zone of the hose dissection unit.

In accordance with any one or more of the foregoing embodiments, the notification unit includes one of: a visual alarm, an audio alarm, or an audio-visual alarm.

In accordance with any one or more of the foregoing embodiments, the hose detection unit includes one of: an RFID reader, or a proximity sensor.

In accordance with any one or more of the foregoing embodiments, the method further comprises determining whether the hose is within a nominal detection zone of the hose detection unit comprises reading an RFID tag attached to the hose, the RFID tag being one of: an active RFID tag, or a passive RFID tag.

In accordance with any one or more of the foregoing embodiments, the proximity sensor is an electromagnetic proximity sensor.

While the invention has been described with reference to one or more particular embodiments, those skilled in the art will recognize that many changes may be made thereto without departing from the spirit and scope of the description. Each of these embodiments and obvious variations thereof is contemplated as falling within the spirit and scope of the claimed invention, which is set forth in the following claims.

What is claimed is:

1. A system for issuing a warning when a hose is attached to a tanker truck with trailer, comprising:
    a notification unit mountable within a driver area of the tanker truck; and
    a hose detection unit in communication with the notification unit and mountable on an exterior of the trailer adjacent to a hose coupling of the trailer;
    wherein the hose detection unit is operable to activate the notification unit when the hose is attached to the hose coupling of the trailer, the hose detection unit configured to wirelessly detect whether a portion of the hose adjacent to the hose coupling of the trailer is within a nominal detection zone of the hose detection unit; and
    wherein the hose detection unit is further operable to reset the notification unit when the hose is detached from the hose coupling of the trailer; and
    further comprising a control valve installed in an air brake system of the tanker truck with trailer, wherein the hose detection unit is further operable to actuate the control valve to lock the air brake system when the hose is attached to the hose coupling of the trailer.

2. The system of claim 1, wherein the notification unit includes one of: a visual alarm, an audio alarm, or an audio-visual alarm.

3. The system of claim 2, wherein the hose detection unit includes an RFID tag attachable to the hose, wherein the RFID tag may be one of: an active RFID tag, or a passive RFID tag.

4. The system of claim 2, wherein the hose detection unit includes an electromagnetic proximity sensor.

5. The system of claim 1, wherein the hose detection unit includes one of: an RFID reader, or a proximity sensor.

6. The system of claim 5, further comprising an RFID tag attachable to the hose, wherein the RFID tag may be one of: an active RFID tag, or a passive RFID tag.

7. The system of claim 5, wherein the proximity sensor is an electromagnetic proximity sensor.

8. The system of claim 1, wherein the trailer comprises one or more containers or tanks containing oilfield materials.

9. The system of claim 8, wherein the oilfield materials comprise a fracturing fluid, proppant, cement, or an oilfield chemical.

10. The system of claim 8, wherein the oilfield materials are offloaded via the hose at an oilfield service site.

11. A method of issuing a warning when a hose is attached to a tanker truck with trailer, comprising:
    wirelessly detecting whether a portion of the hose adjacent to a hose coupling of the trailer is within a nominal detection zone of a hose detection unit mounted on an exterior of the trailer adjacent the hose coupling;
    activating a notification unit mounted within a driver area of the tanker truck if the hose is detected to be within the nominal detection zone of the hose detection unit; and
    resetting the notification unit if the hose is determined to be outside the nominal detection zone of the hose detection unit, and
    further comprising actuating a control valve installed in an air brake system of the tanker truck with trailer to lock the air brake system when the hose is determined to be within the nominal detection zone of the hose detection unit.

12. The method of claim 11, wherein the notification unit includes one of: a visual alarm, an audio alarm, or an audio-visual alarm.

13. The method of claim 12, wherein the hose detection unit includes an RFID reader and wherein wirelessly detecting whether the hose is within a nominal detection zone of the hose detection unit comprises reading an RFID tag attached to the hose, the RFID tag being one of: an active RFID tag, or a passive RFID tag.

14. The method of claim 12, wherein the hose detection unit includes an electromagnetic proximity sensor.

15. The method of claim 11, wherein the hose detection unit includes one of: an RFID reader, or a proximity sensor.

16. The method of claim 15, wherein wirelessly detecting whether the hose is within a nominal detection zone of the hose detection unit comprises reading an RFID tag attached to the hose, the RFID tag being one of: an active RFID tag, or a passive RFID tag.

17. The method of claim 15, wherein the proximity sensor is an electromagnetic proximity sensor.

18. The method of claim 11, wherein the trailer comprises one or more containers or tanks containing oilfield materials.

19. The method of claim 18, wherein the oilfield materials comprise a fracturing fluid, proppant, cement, or an oilfield chemical.

20. The method of claim 18, wherein the oilfield materials are offloaded via the hose at an oilfield service site.

* * * * *